(12) United States Patent
McJimsey (10) Patent No.: US 7,170,267 B1
(45) Date of Patent: Jan. 30, 2007

(54) SWITCHING REGULATOR WITH AVERAGE CURRENT MODE CONTROL

(75) Inventor: Michael David McJimsey, Danville, CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 214 days.

(21) Appl. No.: 10/827,178

(22) Filed: Apr. 19, 2004

Related U.S. Application Data (60) Provisional application No. 60/495,029, filed on Aug. 14, 2003.

(51) Int. Cl.
*G05F 1/59* (2006.01)

(52) U.S. Cl. .................................. 323/271; 323/285

(58) Field of Classification Search ............... 323/271, 323/282, 284, 285, 286
See application file for complete search history.

(56) References Cited

U.S. PATENT DOCUMENTS

| | | | |
|---|---|---|---|
| 4,456,872 A | | 6/1984 | Froeschle |
| 5,808,455 A | * | 9/1998 | Schwartz et al. ............ 323/271 |
| 5,912,552 A | * | 6/1999 | Tateishi ..................... 323/285 |
| 5,955,872 A | * | 9/1999 | Grimm ....................... 323/283 |
| 5,959,443 A | * | 9/1999 | Littlefield .................. 323/287 |
| 6,600,298 B2 | * | 7/2003 | McDonald et al. ......... 323/271 |
| 6,707,281 B2 | * | 3/2004 | Solivan ...................... 323/225 |
| 6,815,939 B2 | * | 11/2004 | Umemoto et al. .......... 323/286 |
| 6,836,100 B2 | * | 12/2004 | Egan et al. ................. 323/272 |

OTHER PUBLICATIONS

Arbetter, B. and Maksimovic, D.; "Control method for low-voltage DC power supply in battery-powered systems with power management". IEEE Power Electronics Specialists Conference, St. Louis, Missouri, Jun. 22-27, 1997.

Levin, G. and O'Malley, K.; "Designing with hysteretic current-mode control". EDN Access, Apr. 28, 1994, http://www.reed-electronics.com/ednmag/archives/1994/042894/09df3.htm.

Levin, G. and O'Malley, K.; "Designing with hysteretic current-mode control". EDN Access, Apr. 11, 1996 http://www.reed-electronics.com/ednmag/archives/1996/041198/08df5.htm.

* cited by examiner

*Primary Examiner*—Jeffrey Sterrett
(74) *Attorney, Agent, or Firm*—Lathrop & Gage LC (57) ABSTRACT

A system and method control an output voltage across a load using current mode control to control current through an output filter connected to the load. The output voltage across the load is compared with a reference voltage to generate a reference current signal indicative of a desired average current through the load. A control signal is generated to indicate when an output current is greater than the desired output current. The output filter is alternately coupled to a first supply rail and to a second supply rail in response to the control signal to generate an average current through the load.

22 Claims, 8 Drawing Sheets

FIGURE 11

SWITCHING REGULATOR WITH AVERAGE CURRENT MODE CONTROL

RELATED APPLICATIONS

This application claims priority to U.S. provisional application Ser. No. 60/495,029, filed 14 Aug. 2003 and hereby incorporated by reference.

BACKGROUND OF THE INVENTION

Switching regulators are used to convert a direct current (DC) voltage into a different, stable DC voltage with high efficiency. They are often used in electronics, such as mobile phones and computer equipment.

Switching regulators generally use one or more switching components, such as field effect transistors (FETs) or metal-oxide semiconductor FETs (MOSFETs) (collectively, FETs) to alternately couple and decouple a voltage source to a load. An output filter, such as an inductor and a capacitor, removes high frequency switching noise to produce the desired average output voltage.

A controller controls the switching components to maintain a substantially average output voltage over the load. A feedback loop provides an input to the controller. The feedback loop generally senses a level of an output voltage across the load, or a current through the load, and inputs that sensed level, in feedback, to the controller. The controller typically adjusts the duty factor (i.e., the portion of time that the output is switched high relative to the switching period) of the switching components in order to control the average voltage output by the output filter.

Current-mode control is another way of controlling the switching behavior of the switching components. Current-mode control achieves regulation of the output voltage through direct or indirect control of the average output current through the output filter and through the load.

Peak current control is one method of implementing current-mode control. With peak current control, the average output current through the load is controlled by controlling the peak current through the inductor. However, for a given peak inductor current, the average output current also depends on the inductor value, switching frequency, duty factor, input supply voltage, and output voltage. These additional dependencies affect the performance of the switching regulator. In addition, peak current control often requires additional compensation to prevent switching instability at duty factors above fifty percent.

SUMMARY OF THE INVENTION

In one embodiment, a voltage regulator has an input terminal coupled to a voltage source and an output terminal coupled to a load through an inductor. The load has an output voltage and an output current when coupled to the voltage source. The voltage regulator comprises a switch configured to alternately (a) couple the output filter to the voltage source and (b) couple the output filter to a supply rail such as ground. An error amplifier compares the output voltage to a desired voltage to output a difference signal indicative of the difference between the output voltage and the desired voltage. A feedback component connects to the error amplifier to produce a feedback current with a feedback current level that is relative to the difference signal. A switching current amplifier receives the feedback current level from the current sensor in the error amplifier and, in response thereto, couples and decouples the output filter inductor to the input voltage source and then to the supply rail, so as to output an average current through the load which is in direct proportion to the feedback error signal.

In another embodiment, an electronic device measures current indicative of a load current. The electronic device is coupled to a voltage source and to a load. The electronic device comprises a power transistor having a first terminal connectable to the voltage source and a second terminal connectable to the load. A first reference transistor is configured to sense a positive current level through the power transistor and to send a positive reference signal indicative of the positive current level. A second reference transistor is configured to sense a negative current level through the power transistor and to send a negative reference signal indicative of the negative current level. The positive and negative reference signals are combined to form a single differential reference signal. A controller is connected constantly with the first reference transistor and the second reference transistor. The controller is configured to receive the differential reference signal and, in response thereto, alternately drive, or not, the power transistor based upon the sensed current level.

DETAILED DESCRIPTION

Certain of the systems and methods described herein employ a switching device that maintains an average current through an output terminal by alternately connecting the output terminal between a first supply rail, such as a voltage source terminal and a second supply rail, such as a ground terminal. A p-type power field-effect transistor ("FET") may be used to connect the output terminal to the voltage source terminal and an n-type power FET may be used to connect the output terminal to the ground terminal. The p-type power FET and the n-type power FET operate on a mutually exclusively basis as follows: when the current through the p-type power FET reaches a desired average output current plus an offset, the p-type power FET is turned off and the n-type power FET is turned on; when the current through the n-type power FET reaches the desired average output current minus the offset, the n-type power FET is turned off and the p-type power FET is turned on again. The current output by the switching regulator passes through an inductor and across a capacitor that cooperate to form an output filter. The waveform of the current through the inductor is, for example, triangular in shape. Therefore, the average output current in this example is half-way between positive and negative peaks in the output current, and is equal to the desired average output current. Accordingly, the desired average output current is achieved independent of switching duty factor, inductor and capacitor value of the output filter, input supply voltage, or output voltage. In addition, the switching behavior is stable, and does not require compensation.

An instantaneous inductor current may be determined by comparing a voltage drop across a reference FET to a voltage drop across one of the power FETs. In one example, a positive p-type reference FET and a negative p-type reference FET connect to a comparator and to a source terminal and a drain terminal, respectively, of the p-type power FET. To determine if the inductor current is positive (i.e., the current flows from the output terminal into the inductor), the positive p-type reference FET is driven by a reference current that is proportional to a desired threshold level of the comparator. Since current through the negative p-type reference FET is substantially zero, there is essentially no voltage drop across the negative p-type reference FET; the comparator may therefore compare the voltage drop across the p-type power FET to the voltage drop across the positive p-type reference FET to determine if the output current is equal to or greater than the desired threshold level. In one embodiment, the p-type power FET is constructed from 40,000 FETs that are substantially identical to the positive p-type reference FET and the negative p-type reference FET. Thus, when the voltage drop across the p-type power FET is equal to the voltage drop across the either the positive p-type reference FET or the negative p-type reference FET, the current through the power FET is 40,000 times the reference current. Similarly, the n-type power FET has a positive n-type reference FET and a negative n-type reference FET; a voltage drop across the n-type power FET may also be compared to the voltage drop across the positive n-type reference FET or the negative n-type reference FET, to determine if the output current is equal to or less than the desired threshold level.

To determine if the inductor current is negative (i.e., current flows into the output terminal from the inductor) the reference current is driven through the negative p-type reference FET and no current is driven through the positive p-type reference FET. The voltage drop across the reference FETs is then compared to the voltage drop across the respective power FETs, to determine if the output current is equal to or less than the desired threshold level.

Figure 1:
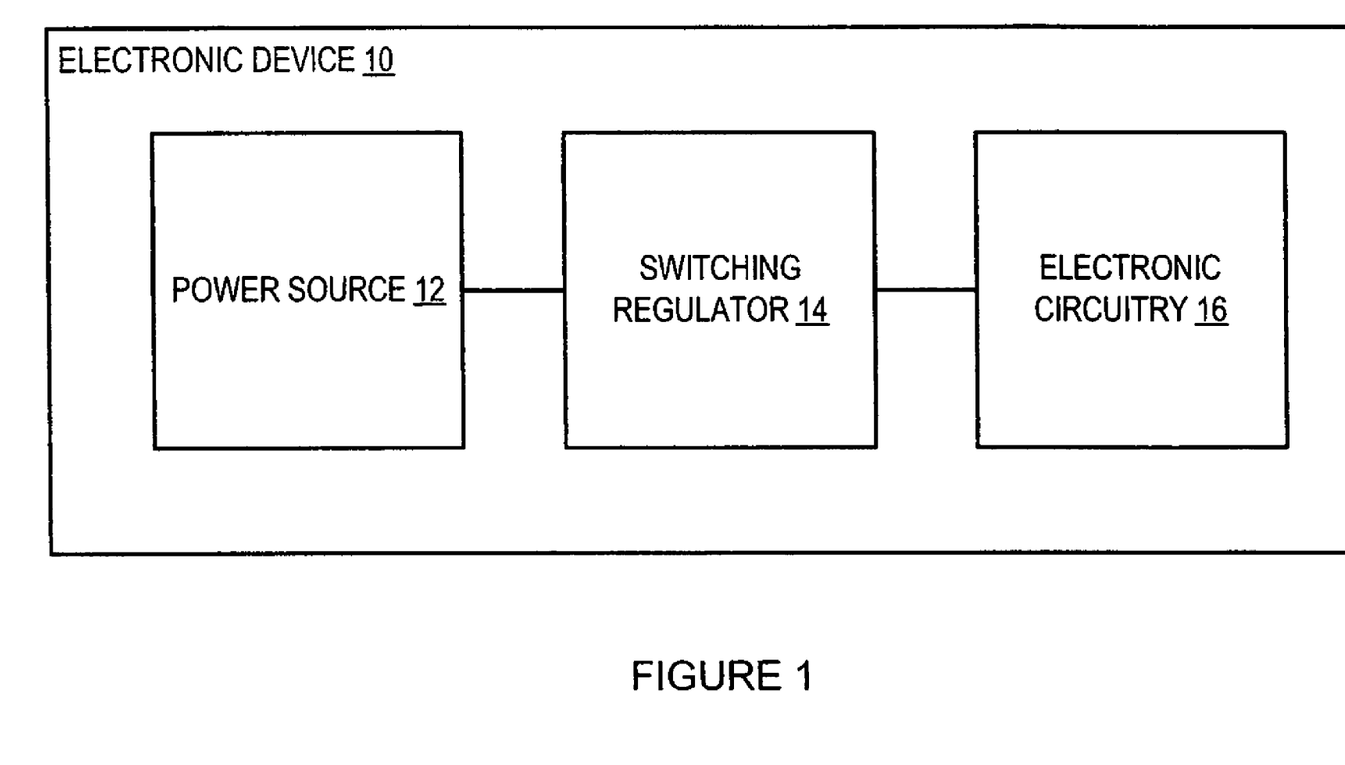
FIG. 1 is a block diagram illustrating exemplary use of a current mode control switching regulator within an electronic device.

FIG. 1 depicts a block diagram illustrating exemplary use of a current-mode-control switching regulator 14 within an electronic device 10. Switching regulator 14 conditions power from a power source 12 for use by electronic circuitry 16. Electronic device 10 is, for example, a mobile phone; power source 12 is, for example, a rechargeable battery; and electronic circuitry 16 is, for example, circuitry within the mobile phone.

Figure 2:
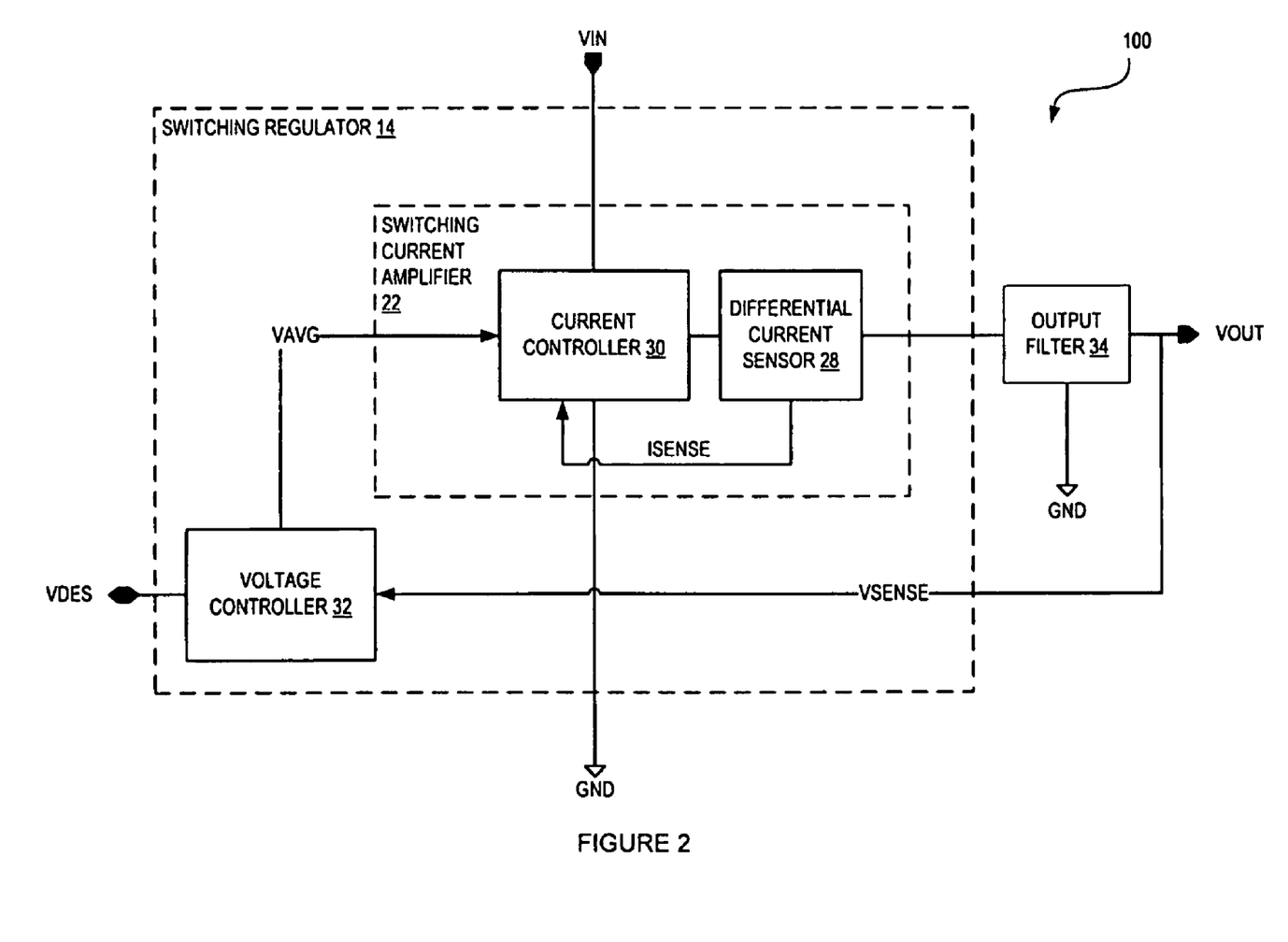
FIG. 2 is a block diagram illustrating a switching current amplifier and certain other components of the current mode control switching regulator of FIG. 1, in a system for controlling an output voltage across a load.

FIG. 2 is a block diagram illustrating certain components of the current mode control switching regulator 14 of FIG. 1, in a system 100 for controlling an output voltage across a load. System 100 for example uses current mode control to control current through an output filter connected to the load. In FIG. 2, output voltage VOUT is sensed as VSENSE and compared to a desired output voltage VDES by a voltage controller 32. Voltage controller 32 generates a control signal VAVG indicative of a desired average current through an output filter 34 such that output voltage VOUT equals VDES. Switching regulator 14 includes a switching current amplifier 22 that has a current controller 30 and a differential current sensor 28. Current controller 30 operates to alternately connect output filter 34 to VIN and GND, via differential current sensor 28, thereby regulating average current through output filter 34. Differential current sensor 28 measures the current through output filter 34 and provides a feedback signal ISENSE to current controller 30. Current controller 30 compares feedback signal ISENSE with the desired average current indicated by control signal VAVG to implement the alternating connection between output filter 34 and VIN or GND.

Figure 3:
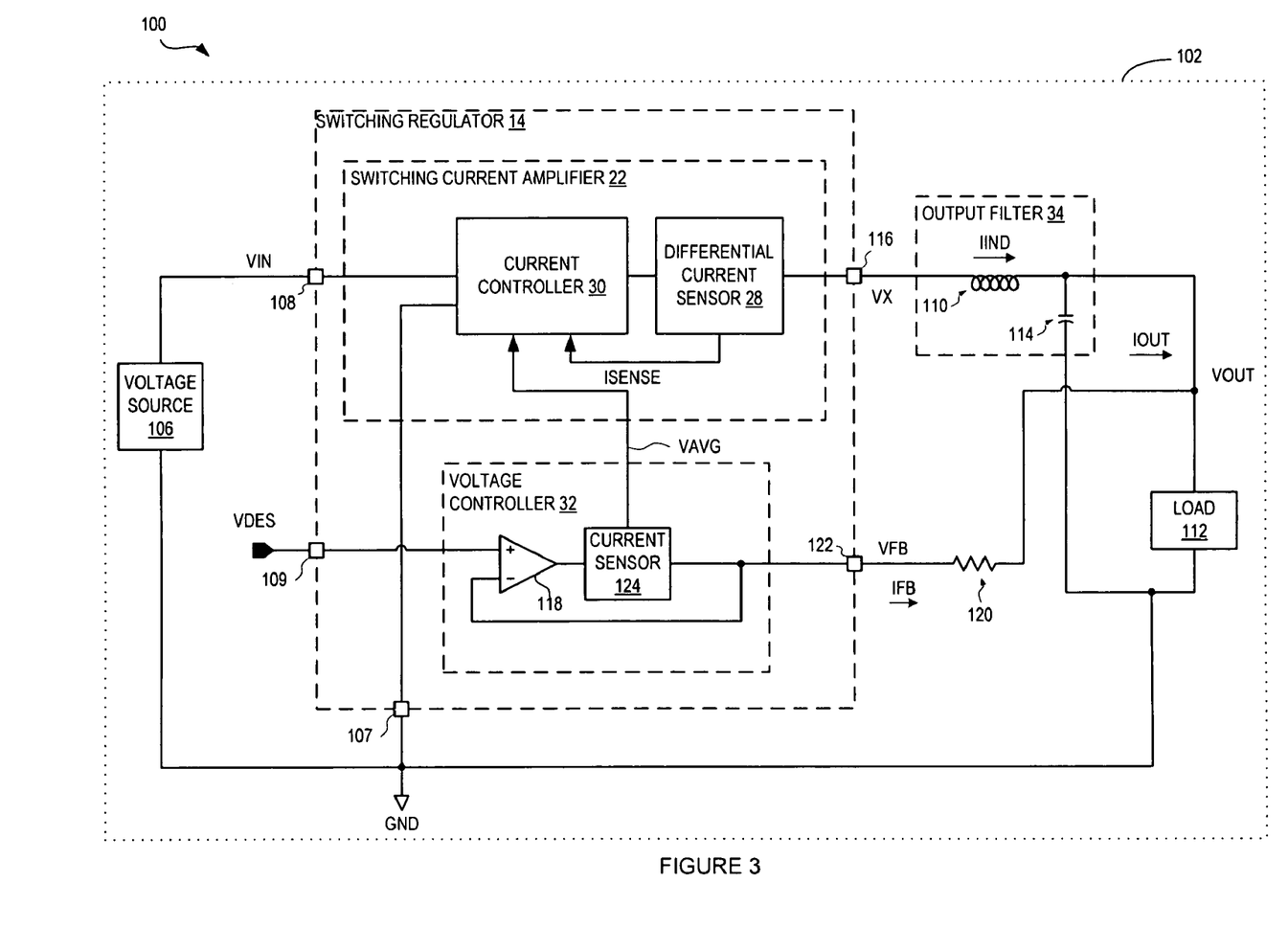
FIG. 3 is a block diagram illustrating an exemplary circuit of the switching regulator of FIGS. 1 and 2, including an error amplifier.

FIG. 3 depicts an exemplary circuit 102 (indicated by a dotted box), including one embodiment of switching regulator 14, FIG. 2. In circuit 102, switching regulator 14 couples to a voltage source 106 at a voltage input terminal 108, and a ground power rail GND at a terminal 107. An output terminal 116 of regulator 14 couples to a load 112 through an inductor 110. A load capacitor 114 connects in parallel with load 112, as shown. Load capacitor 114 and inductor 110 cooperate to form output filter 34 that operates to remove high frequency switching noise, generated by switching regulator 14, from output voltage VOUT. The average current IIND through inductor 110 equals the average current IOUT through load 112. In the exemplary embodiment, current IIND has a triangular waveform.

Figure 4:
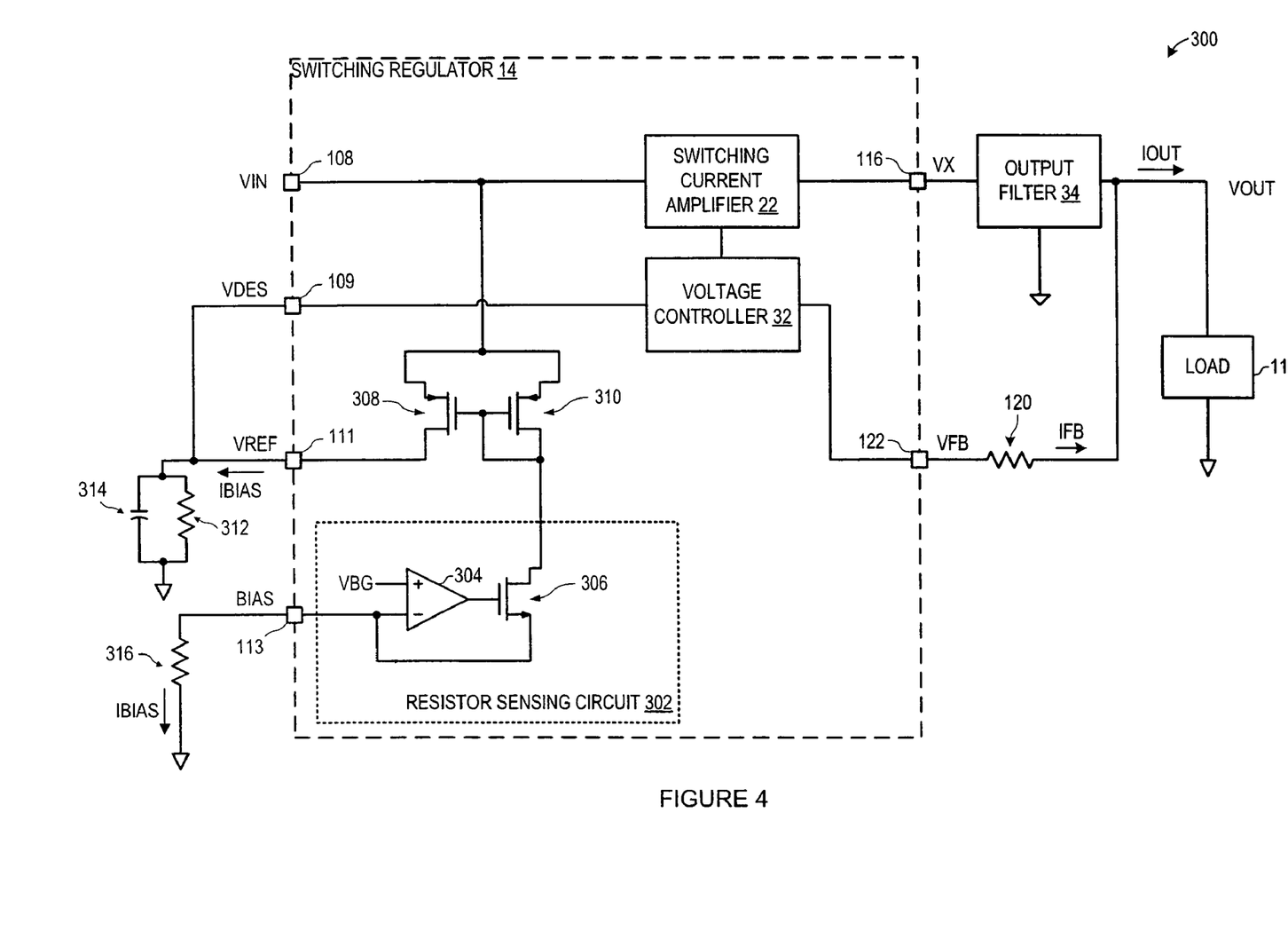
FIG. 4 is a schematic diagram of one circuit showing exemplary detail of the switching regulator of FIG. 2, including circuitry to facilitate generation of an output voltage reference.

Desired output voltage reference (VDES) inputs to switching regulator 14 at a terminal 109. VDES may be derived from various methods. For example, VDES may be derived as illustrated in FIG. 4 and described below; though VDES may derive from another voltage source. In the illustrated embodiment, voltage controller 32 includes an error amplifier 118 and a current sensor 124. Error amplifier 118 compares desired output voltage reference VDES with a voltage VFB at a terminal 122. A feedback resistor 120 senses voltage VOUT across load 112, and connects to a negative input of error amplifier 118 via terminal 122. Error amplifier 118 operates to maintain voltage VFB equal to VDES by driving a current IFB through resistor 120. Current IFB causes a voltage drop across resistor 120 equal to the voltage difference between VDES and voltage VOUT. Current IFB is thereby indicative of the voltage error across load 112.

In one embodiment, resistor 120 is external to switching regulator 14 and may be adjusted to vary the performance of switching regulator 14. This adjustment allows a user to control the unity gain bandwidth of switching regulator 14 and the amount of voltage droop at full load.

Current IFB, generated by error amplifier 118, is measured by current sensor 124, which generates signal VAVG representative of an average current through load 112 so that VOUT equals VDES. Signal VAVG is input to switching current amplifier 22, as shown. Switching current amplifier 22 thereby operates with voltage controller 32 to generate current IIND through output filter 34 such that current IOUT through load 112 results in voltage VOUT equal to voltage VDES. In one embodiment, switching current amplifier 22 amplifies the measurement signal by a gain factor (Ki) of approximately 120,000.

Switching current amplifier 22 operates to connect terminal 116 of switching regulator 14 to VIN or to GND, such that the average of current IIND through inductor 110 is equal to the desired average current represented by signal VAVG from voltage controller 32. The resulting waveform of current IIND (through inductor 110) is, in this example, triangular; the peak currents through inductor 110 are symmetrical about the average current. The average value of the triangular waveform is therefore equal to the average of the upper and lower peak current values and is directly proportional to signal VAVG from current sensor 124. Switching regulator 14 operates to control the average voltage across load 112 by controlling the current through inductor 110 and load 112.

In one embodiment, error amplifier 118 and switching current amplifier 22 cooperate to behave like a transconductance (gm) stage with a gain given by the equation: gm=Ki/RFB. This results in an effective output resistance of 1/gm and a unity gain frequency given by the equation: $f_{unity}$=gm/(2*π*CLOAD), where CLOAD is the capacitance of capacitor 114. The unity gain frequency may be expressed as $f_{unity}$=Ki/(2*π*CLOAD*RFB), where RFB is the resistance of feedback resistor 120.

It is often useful for switching regulator 14 to have well-defined, linear amount of change in output voltage versus output current; this change in output voltage versus output current is commonly called droop. The output droop of switching regulator 14 may be given by the equation: $V_{droop}$=IOUT*RFB/Ki.

FIG. 4 is a schematic diagram of a circuit 300 showing exemplary detail of switching regulator 14, including circuitry to facilitate generation of output voltage reference VDES. In the illustrated example of FIG. 4, a resistor sensing circuit 302 includes an amplifier 304 connected to a band-gap voltage VBG and a FET 306. VBG is, for example, 1.23 volts and generated by reference source 919, shown in FIG. 11. Sensing circuit 302 applies voltage VBG across an external resistor 316 via terminal 113, generating a current IBIAS through resistor 316. Sensing circuit 302 also operates to control FETs 308 and 310 such that current IBIAS is mirrored through a terminal 111, and, thereby, through a reference resistor 312. Current IBIAS generates a voltage across resistor 312 which is input as VDES to terminal 109, as shown. By selection of resistors 312 and 316, desired output voltage reference VDES may be selected. In one embodiment, voltage VDES at terminal 109 is determined by VDES=VBG*(RREF/RBIAS), where RREF is the resistance of resistor 312 and RBIAS is the resistance of resistor 316. Accordingly, the output voltage VOUT across load 112 may equal VDES minus a voltage droop caused by resistor 120, as defined in the following equation:

VOUT=VBG*(RREF/RBIAS)−IOUT*RFB/Ki

Figures 5, 6, 7:
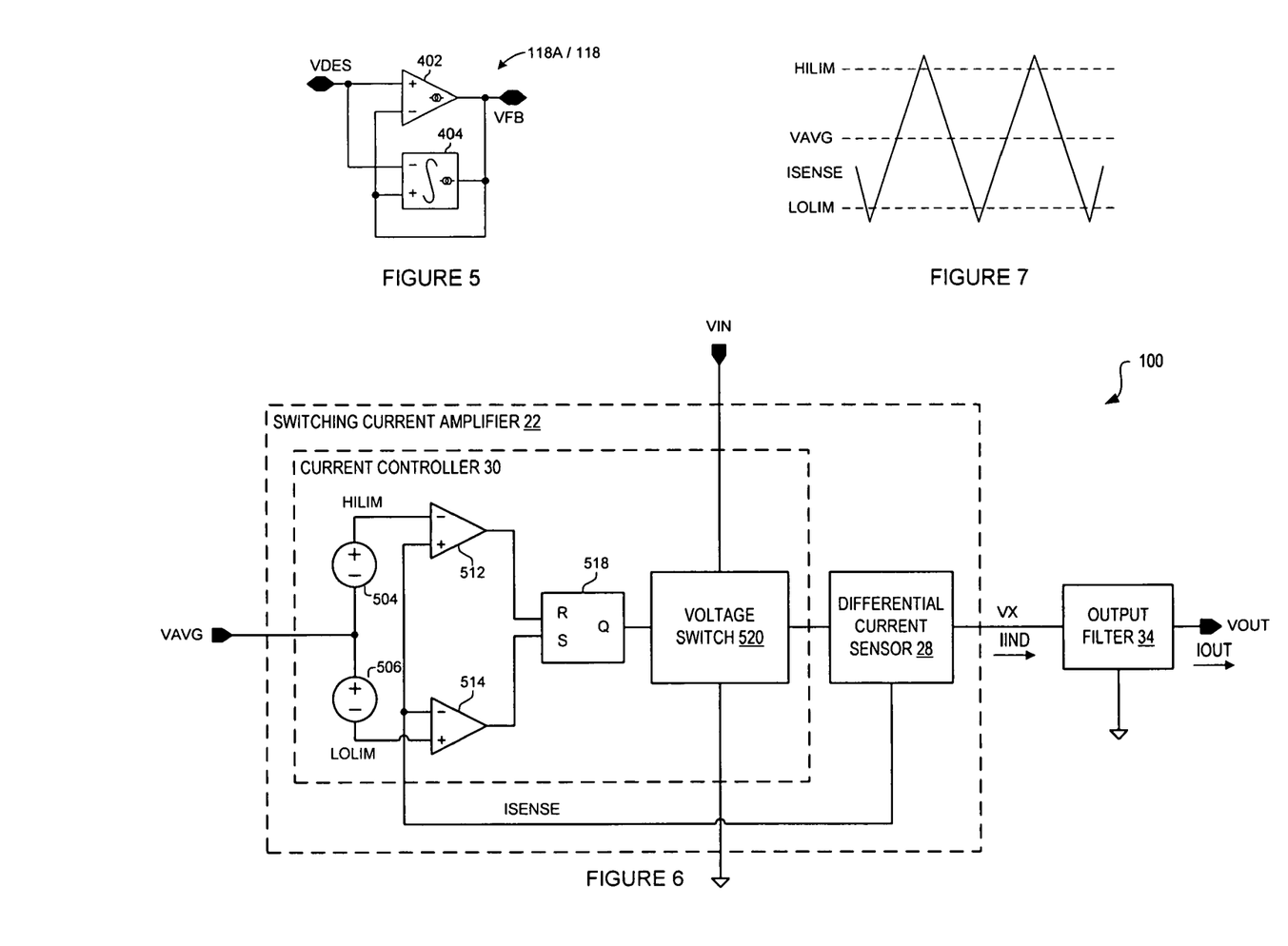
FIG. 5 is a schematic diagram illustrating an exemplary embodiment of the error amplifier of FIG. 3.
FIG. 6 illustrates one embodiment of the switching current amplifier of FIG. 2.
FIG. 7 is a block diagram illustrating one switching waveform.

FIG. 5 is a schematic diagram illustrating an exemplary embodiment of an error amplifier 118A (e.g., suitable for use as amplifier 118, FIG. 3). Error amplifier 118A includes a high frequency transconductance stage 402 and a low-frequency current-output integrator 404, connected together in parallel. Transconductance stage 402 amplifies feedback current IFB and integrator 404 corrects for offsets in transconductance stage 402. Integrator 404 has a high gain and enables switching regulator 14 (FIGS. 2–4) to operate with substantially zero droop if feedback resistor 120 has a resistance of zero ohms. Moreover, since error amplifier 118A outputs current, and not voltage, high-frequency common-mode noise rejection of switching regulator 14 may be improved over voltage output amplifiers. Additionally, the high output impedance of error amplifier 118A, combined with the common-mode rejection of its differential inputs, increases the immunity of error amplifier 118A to common-mode voltage transients between switching regulator 14 and load 112.

FIG. 6 illustrates one embodiment of switching current amplifier 22. In FIG. 6, VAVG is a voltage representing a desired average output current IOUT. VAVG is generated by voltage controller 32, FIG. 3, for example. Two voltage threshold levels, HILIM and LOLIM, are generated symmetrically around voltage VAVG by offsets 504 and 506. The difference between HILIM and LOLIM represents an allowable ripple in output current IOUT from switching current amplifier 126A; each offset 504, 506 representing half the ripple value. Differential current sensor 28 senses current IIND through output filter 34 and generates a voltage signal ISENSE representative of current IIND. Signal ISENSE is fed back to two comparators 512, 514 of current controller 30, which compares signal ISENSE with threshold levels HILIM and LOLIM, thereby comparing current IIND to the desired average output current VAVG, while allowing for ripple. Comparators 512 and 514 cooperate to toggle an output Q of a set-reset latch 518 when signal ISENSE reaches either threshold level HILIM or LOLIM. Output Q from set-reset latch 518 is input to voltage switch 520, which connects output filter 34 to either VIN or GND through differential current sensor 28. The resulting waveform of signal ISENSE and threshold levels HILIM and LOLIM are illustrated in FIG. 7. The average of signal ISENSE, shown as VAVG, may be achieved independent of switching duty factor, output filter 34 inductor value (e.g., of inductor 110, FIG. 3), output filter 34 capacitor value (e.g., of capacitor 114, FIG. 3), input supply voltage VIN, and/or output voltage VOUT. The actual switching frequency depends on the peak to peak current amplitude (Ipk–pk), the inductance (LOUT) of inductor 110, and input and output voltages (VIN, VOUT) as given by the equation: $F_{switch}$=VOUT*(VIN−VOUT)/(VIN*LOUT*IPk−pk)

Figure 8:
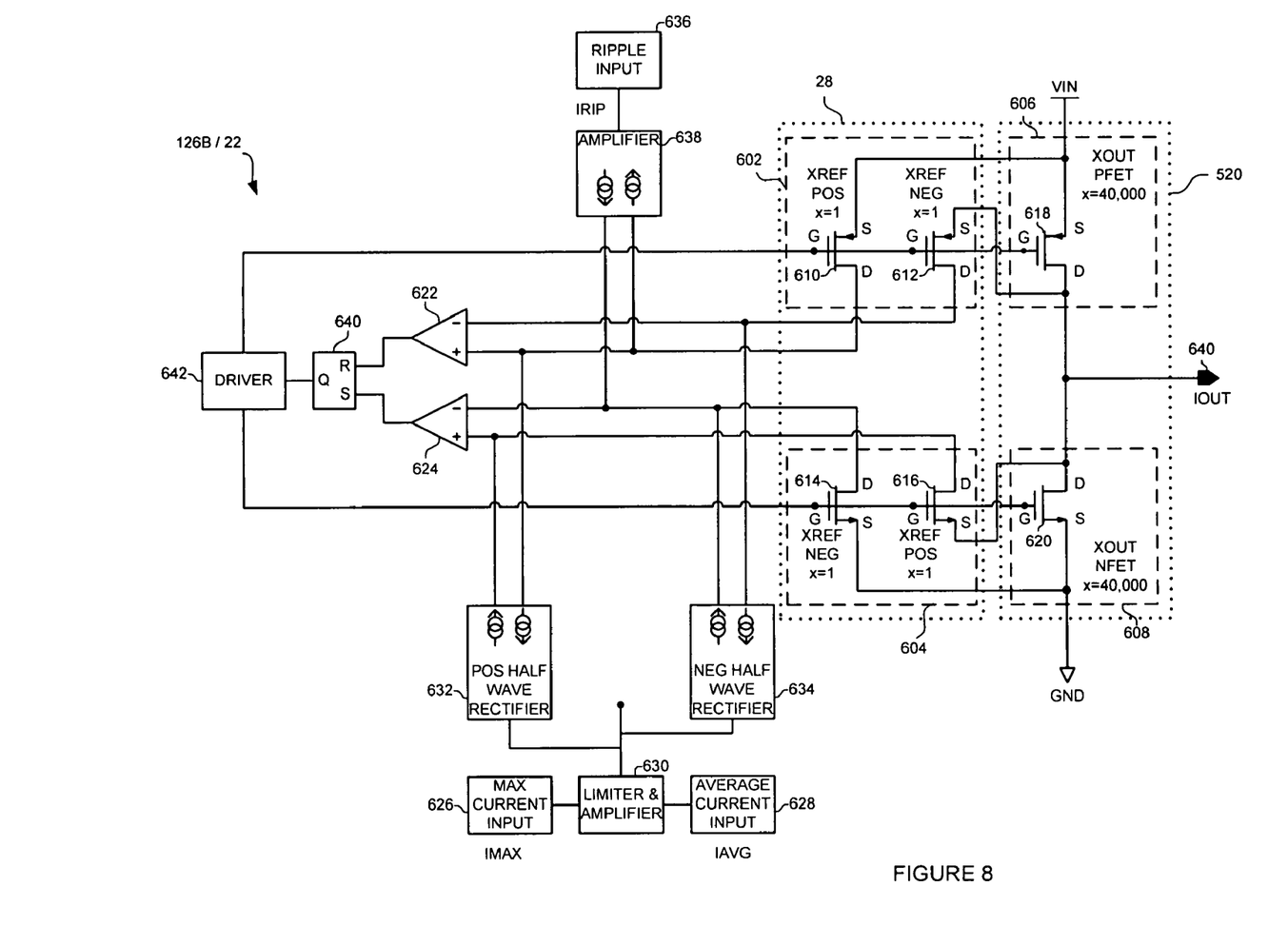
FIG. 8 is a block diagram illustrating one embodiment of the switching current amplifier of FIG. 6, including comparators for comparing voltage drops across reference FETs with voltage drops across power FETs.

FIG. 8 is a schematic diagram illustrating one embodiment of a switching current amplifier 126B suitable for use as switching current amplifier 22, FIG. 6, for example. The embodiment of FIG. 8 illustrates an exemplary class B drive circuit for controlling output current IOUT. Switching current amplifier 126B includes two switching elements 606 and 608 that connect output 640 to either VIN or GND. Switching current amplifier 126B also includes two sensing elements 602 and 604 that sense both positive and negative currents in switching elements 606 and 608. Sensing elements 602 and 604, for example, may be used as differential current sensor 28, FIGS. 2, 3, 6 (current sensor 28 is indicated by a dotted box in FIG. 8).

Sensing element 602 has a positive p-type reference FET 610 and a negative p-type reference FET 612. Sensing element 604 has a positive n-type reference FET 614 and a negative n-type reference FET 616. Switching element 606 has a p-type power FET 618 and switching element 608 has a n-type power FET 620. Reference FETs 610, 612, 614 and 616 enable switching current amplifier 126B to sense positive or negative output current IOUT when output 640 is connected to either VIN or GND. As described below, p-type reference FETs 610, 612 are utilized to sense both positive and negative currents through p-type power FET 618. Likewise, the n-type reference FETs 614, 616 are utilized to sense both positive and negative currents through n-type power FET 620. P-type reference FETs 610 and 612 are identical p-type FETs; p-type power FET 618 is, for example, constructed from 40,000 p-type FETs, identical to p-type reference FETs 610 and 612. Reference FETs 614 and 616 are identical n-type FETs; n-type power FET 620 is, for example, constructed from 40,000 n-type FETs identical to n-type reference FETs 614 and 616. Resistance of p-type power FET 618, when turned on, is therefore (in this example) $1/40,000^{th}$ of the resistance of p-type reference FET 610 (or p-type reference FET 612) when turned on. Similarly, resistance of n-type power FET 620, when turned on, is (in this example) $1/40,000^{th}$ that of n-type reference FET 614 (or n-type reference FET 616), when turned on.

In the example of FIG. 8, a desired average output current is represented by an input current signal IAVG input at a terminal 628. For example, current sensor 124 of voltage controller 32, FIG. 3, may generate current signal IAVG proportional to a determined average output current IOUT. A maximum current input signal IMAX is input at a terminal 626 and is proportional to a maximum desired output current. Signals IMAX and IAVG are similarly scaled and connect to a limiter and amplifier 630. In one embodiment, the absolute value of IAVG is first limited to IMAX and then amplified by a factor of three. For example, if IMAX is 120 µA and IAVG is 200 µA, the output of limiter and amplifier 630 would be a current of 360 µA.

The output of limiter and amplifier 630 is input to a positive half wave rectifier 632 and a negative half wave rectifier 634. If the output of limiter and amplifier 630 is positive, positive half wave rectifier 632 sinks a reference current, equal to the current output from limiter and amplifier 630, through p-type reference FET 610 and sources a reference current, equal to the current output from limiter and amplifier 630, through reference FET 616. If IAVG is negative, positive half wave rectifier sources and sinks zero current. If IAVG is positive, negative half wave rectifier 634 sinks and sources zero current. If IAVG is negative, negative half wave rectifier 634 sinks a reference current, equal to the current output from limiter and amplifier 630, through reference FET 612, and also sources a reference current, equal to the current output from limiter and amplifier 630, through reference FET 614.

In one example, an IAVG current of 501A and an IMAX current of 120 µA (a typical value that, in the example, limits output current to 14.4 A) results in an average output current of 6A, as the ratio of power FET 618 (or 620) to reference FET 610 and 612 (or 614 and 616) is 40,000 and the IAVG current is amplified by a factor of three (e.g., IOUT=50 µA*3*40,000).

A ripple current (IRIP) is input to an amplifier 638 via a terminal 636. In one example, ripple current IRIP is amplified by a factor of one and one-half by amplifier 638. Amplifier 638 operates to source a current one and one-half times IRIP through negative n-type reference FET 614, and sink a current one and one-half times IRIP through positive p-type reference FET 610. Amplifier 638 operates to increase current through positive p-type reference FET 610 and negative n-type reference FET 614, thereby giving a hysteresis to switching thresholds of switching current amplifier 126B.

Positive p-type reference FET 610 connects to a positive input of a comparator 622 and negative p-type reference FET 612 connects to a negative input of comparator 622, as shown. Comparator 622 compares a voltage drop across reference FETs 610 and 612 with a voltage drop across p-type power FET 618. When output current IOUT creates a voltage across power FET 618 equal to the voltage across positive p-type reference FET 610 and negative p-type reference FET 612, comparator 622 causes an R S latch 640 to toggle its output, causing driver 642 to switch p-type power FET 618 (and p-type reference FETs 610, 612) off, and n-type power FET 620 (and n-type reference FETs 614, 616) on.

Similarly, comparator 624 compares the voltage across power FET 620 with the voltage across reference FET 614, causing R S latch 640 to toggle when the voltage across power FET 620 reduces to the voltage across reference FET 614.

Comparators 622 and 624 thereby operate to toggle R S latch 640 such that driver 642 turns FETs 610, 612, 618 and FETs 614, 616, 620 on and off to maintain an average output current IOUT.

Figure 9:
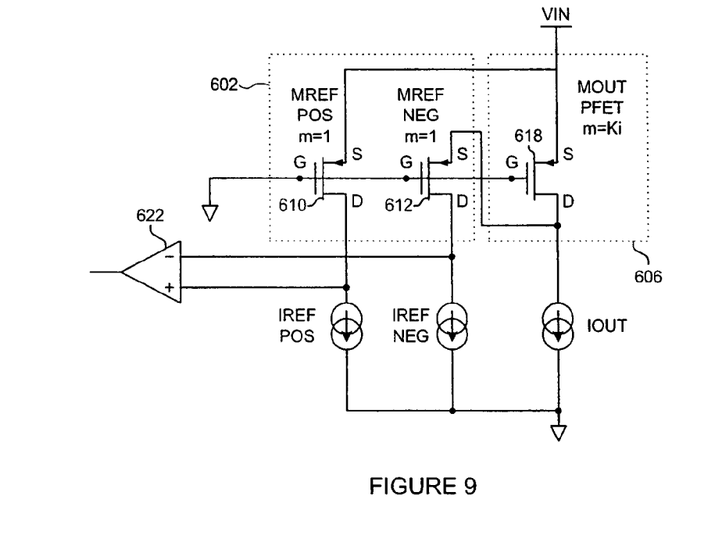
FIG. 9 is a block diagram illustrating one current sensing circuit involving a comparator of FIG. 8.

Referring to FIG. 9, current sensing may be performed through comparator 622, which compares a voltage across power FET 618 with a voltage across reference FETs 610, 612. Reference FETs 610 and 612 are driven with reference currents that define threshold current levels of FET 618. When output current IOUT reaches the threshold current, the inputs of comparator 622 are at the same voltage. Therefore, the sum of the voltages across FETs 610, 612 and 618 equal zero since they form a loop from one input of comparator 622 to the other, as in the following equation:

Irefpos*Rrefpos−(IOUT+Irefneg)*Routp−
    Irefneg*Rrefneg=0 where Rrefpos, Rrefneg, and Routp are the resistances of positive p-type reference FET 610, negative p-type reference FET 612, and p-type power FET 618, respectively. Presuming that Rrefpos and Rrefneg are equal (hereinafter Rref), and that Rref/Routp=Ki, and Ki>>1, this equation simplifies to: IOUT=Ki*(Irefpos−Irefneg), defining the value of IOUT at the desired threshold current level.

The threshold value of IOUT depends on the difference between reference currents and is therefore not sensitive to common-mode current. This enables half-wave rectifiers 632 and 634 to drive reference FETs 610, 612, 614 and 616 by splitting positive and negative portions of the signal before application to FETs 610, 612, 614 and 616. When the output current is positive, positive half-wave rectifier 632 drives reference FETs 610 and 616, and negative half-wave rectifier 634 does not drive reference FETs 612 and 614. When the output current is negative, negative half-wave rectifier 634 drives reference FETs 612 and 614, and positive half-wave rectifier 632 does not drive reference FETs 610 and 616. The utilization of two reference FETs (e.g., p-type reference FETs 610, 612) per power FET (e.g., p-type power FET 618) and half-wave rectifier current sources (e.g., half wave rectifier 632, 634) eliminates the need to switch between reference FETs to measure opposite polarity currents through the power FETs, thereby providing seamless transition between sensing positive and negative currents through power FETs.

Figure 10:
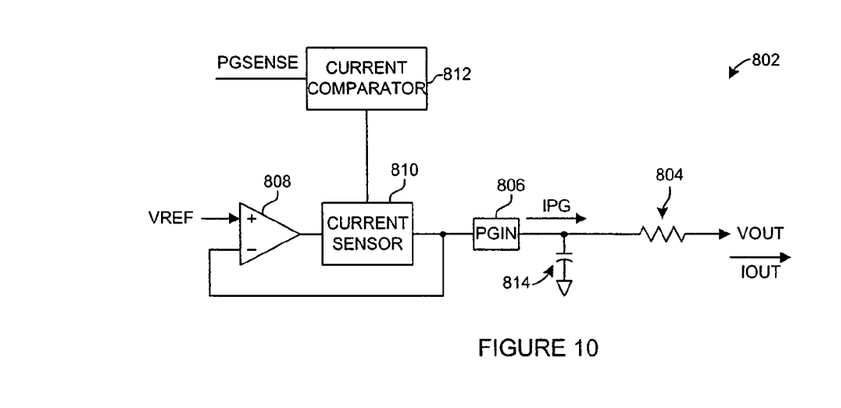
FIG. 10 is a block diagram illustrating one exemplary circuit used to determine when the output voltage is within a specified tolerance of the desired voltage, in the switching regulator of FIGS. 1 and 2.

Switching regulator 14, FIG. 2, may optionally include a voltage sensing circuit 802 as shown in FIG. 10. Voltage sensing circuit 802 is utilized to determine if output voltage VOUT is within a selected tolerance limit set by a sensing resistor 804. Sensing resistor 804 is connected between output voltage VOUT and a terminal 806 (PGIN). A transconductance amplifier 808 connects to PGIN as a unity-gain voltage follower and operates to maintain the voltage of PGIN terminal 806 equal to an input reference voltage VREF. Any difference between VREF and VOUT generates a current IPG through resistor 804, which may be calculated using the equation: IPG=(VREF−VOUT)/(RPG+ 1/gm), where RPG is the resistance of resistor 804. A current sensor 810 generates a signal indicative of current IPG flowing through terminal 806. The signal is fed to a current comparator 812 with a pre-defined threshold current level. In one embodiment, the threshold current level is set at +/−10 µA with 1 µA of hysteresis. A signal PGSENSE is generated by comparator 812 and indicates if voltage VOUT is within the defined tolerance. A capacitor 814 may be included to compensate transconductance amplifier 808 and to control the response time of voltage sensing circuit 802. A voltage tolerance (VTOL) may be set to a desired value by setting IPG to 10 µA in the above equation and by solving for RPG, as shown in the following equation: RPG=(VTOL/10 µA)− 1/gm.

Figure 11:
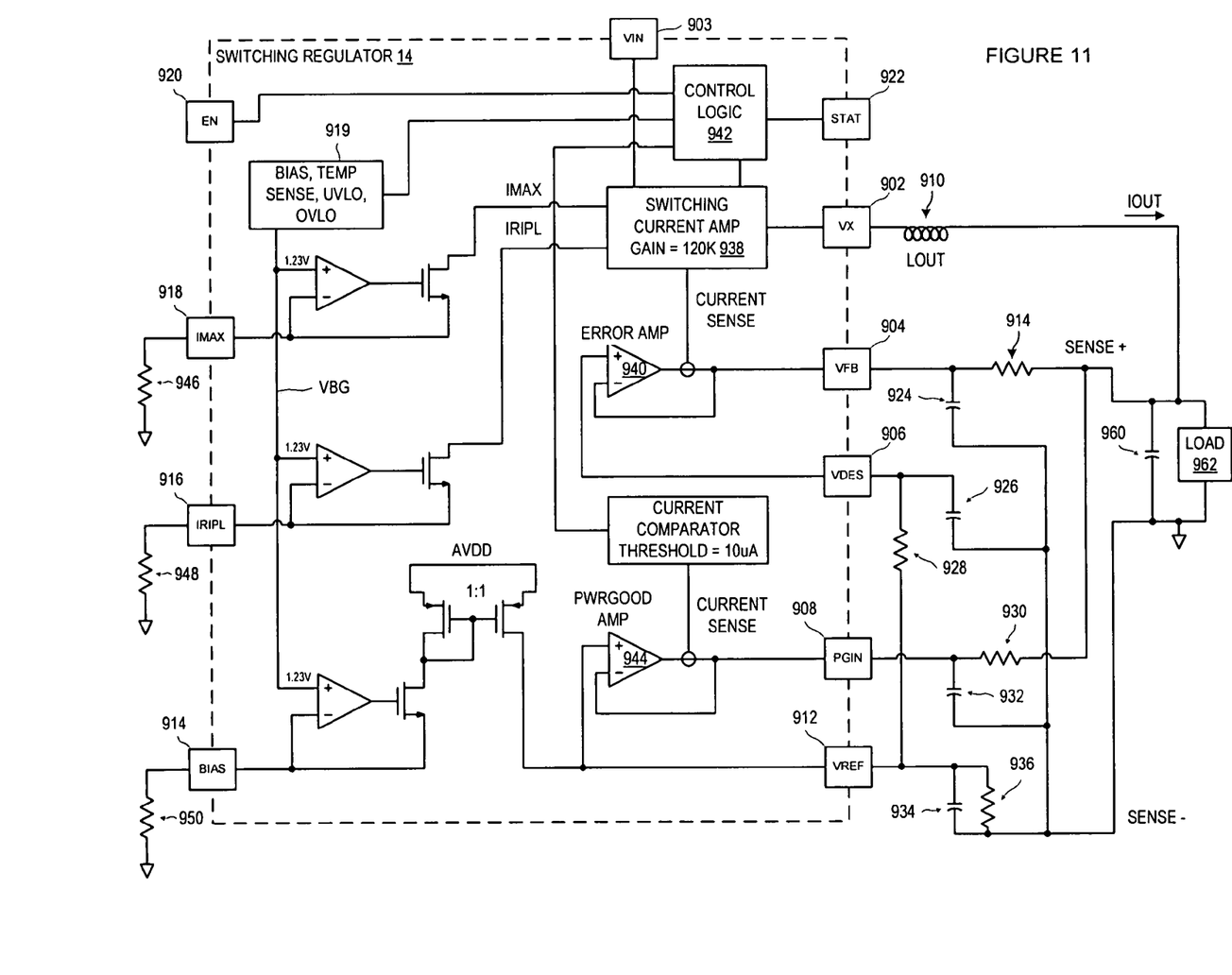
FIG. 11 is a schematic diagram of one exemplary switching circuit of the switching regulator of FIGS. 1 and 2.

FIG. 11 illustrates an exemplary embodiment of a switching regulator 14. Power is supplied to switching regulator 14 at a terminal 903 (VIN), and a load 962, with a capacitor 960 connected in parallel, connects to an output terminal 902 (VX) through an inductor 910. Inductor 910 and capacitor 960 cooperate to form an output filter (e.g., output filter 34, FIG. 2). A resistor 914 connects between a terminal 904 (VFB) and load 962 at SENSE+ and operates to provide feedback of voltage across load 962. A resistor 930 connects between a terminal 908 (PGIN) and SENSE+ and cooperates with a 'powergood' amplifier 944 to provide feedback to control logic 942, which determines whether VOUT is within a desired tolerance of a desired output voltage. A resistor 936 connects between a terminal 912 (VREF) and SENSE− of load 962 to generate the desired reference voltage for switching regulator 14. A resistor 928 may be used to provide "soft-start" capability by slowing the rise time of the desired output voltage VDES reference on terminal 906. Control logic 942 with powergood amplifier 944 generate a status signal at a terminal 922 (STAT). In this example, input terminals 918 (IMAX), 916 (IRIPL) and 914 (BIAS) are connected to GND using resistors 946, 948 and 950, respectively.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A system for controlling an output voltage across a load using current mode control to control current through an output filter connected to the load, comprising:
   an error amplifier for generating a reference current signal indicative of a desired average current through the load by comparing a voltage across the load to a reference voltage;
   a differential current sensor having hysteresis that uses the reference current signal to generate a control signal indicating when an output current is greater than the desired average current; and
   a current controller, responsive to the control signals to alternately couple the output filter to a first supply rail and to a second supply rail, to generate the desired average current through the load.

2. The system of claim 1, wherein the hysteresis of the differential current sensor is determined by an offset signal.

3. The system of claim 2, the current controller further comprising a positive power field-effect transistor (FET) and a negative power FET, the positive power FET coupling and de-coupling the output filter to and from the first supply rail, and the negative power FET coupling and decoupling the output filter to and from the second supply rail.

4. The system of claim 3, the differential current sensor further comprising a first positive reference FET that creates a voltage for comparison to the positive power FET, a second positive reference FET that creates a voltage for comparison to the negative power FET, the first and second positive reference FETs driven by the reference current when the desired output current is positive.

5. The system of claim 4, the differential current sensor further comprising a first negative reference FET that creates a voltage for comparison to the positive power FET, a second negative reference FET that creates a voltage for comparison to the negative power FET, the first and second negative reference FETs driven by the reference current when the desired output current is negative.

6. The system of claim 5, the positive power FET being constructed from X FETs that are substantially identical to the first positive reference FET and the first negative reference FET, such that the resistance of the positive power FET is 1/X of the first positive reference FET and the first negative reference FET, and the output current being X times the reference current.

7. The system of claim 6, wherein X is approximately 40,000.

8. The system of claim 5, the negative power FET being constructed from X FETs that are substantially identical to the second positive reference FET and the second negative reference FET, such that the resistance of the negative power FET is 1/X of the second positive reference FET and the second negative reference FET, and the output current being X times the reference current.

9. The system of claim 8, wherein X is approximately 40,000.

10. The system of claim 5, the current controller further comprising a first comparator for comparing the voltage drop across the positive power FET with the voltage drop across the first positive reference FET plus the voltage drop across the first negative reference FET, the first comparator generating a first signal indicating that the output current is equal to or exceeds the desired average current plus an offset.

11. The system of claim 10, the current controller further comprising a second comparator for comparing the voltage drop across the negative power FET and the second positive reference FET plus the second negative reference FET, the second comparator generating a second signal indicating that the output current is equal to or less than the desired average current minus an offset.

12. The system of claim 11, further comprising a driver that, in response to the first and second signals, alternately turns on (a) the positive power FET, the first positive reference FET, and the first negative reference FET, and (b) the negative power FET, the second positive reference FET, and the second negative reference FET.

13. The system of claim 2, wherein the offset signal is representative of half an allowable ripple on the output current.

14. The system of claim 13, wherein the offset signal is generated from a reference source within the system.

15. The system of claim 2, the differential current sensor further comprising a differential current threshold detector for monitoring current in the load comprising:

a first transistor having a source, a drain, and a gate; and a second transistor having a gate coupled to the gate of the first transistor;

wherein: the gate of the first transistor couples to a gate of a power FET having:

a drain coupled to the load and to a source of the second transistor, and a source coupled to the source of the first transistor; and a first current source coupled to the drain of the first transistor;

the drain of the second transistor coupled to a second current source; and the drain of the first transistor and the drain of the second transistor coupled to a first input of a differential amplifier.

16. The system of claim 15, wherein a difference between a current of the first current source and a current of the second current source is a function of the offset signal.

17. The system of claim 15 wherein the third transistor serves as a switch of the current controller.

18. The system of claim 1, further comprising an external resistor connected between the load and the error amplifier, for determining the output voltage droop.

19. A method for controlling an output voltage across a load, comprising:

comparing the output voltage across the load to a reference voltage;

generating a reference current signal indicative of a desired average current through the load;

generating a control signal indicating when an output current is greater than the desired average current; and alternately coupling an output filter to a first supply rail and to a second supply rail in response to the control signal, to generate the desired average current through the load.

20. The method of claim 19, the control signal having hysteresis.

21. The method of claim 20, the hysteresis being determined by an offset signal.

22. The method of claim 19, the step of comparing comprising determining a voltage droop via an external resistor connected to the load.

* * * * *

UNITED STATES PATENT AND TRADEMARK OFFICE
CERTIFICATE OF CORRECTION

PATENT NO.        : 7,170,267 B1
APPLICATION NO.   : 10/827178
DATED             : January 30, 2007
INVENTOR(S)       : Michael David McJimsey It is certified that error appears in the above-identified patent and that said Letters Patent is hereby corrected as shown below:

Column 2, lines 56-57, the words "exemplary switching circuit" should read --exemplary circuit--

Signed and Sealed this

Tenth Day of July, 2007

JON W. DUDAS
*Director of the United States Patent and Trademark Office*